Oct. 9, 1945.           H. M. MARTIN            2,386,701
                     DYNAMOELECTRIC MACHINE
                     Filed May 27, 1944          2 Sheets-Sheet 1
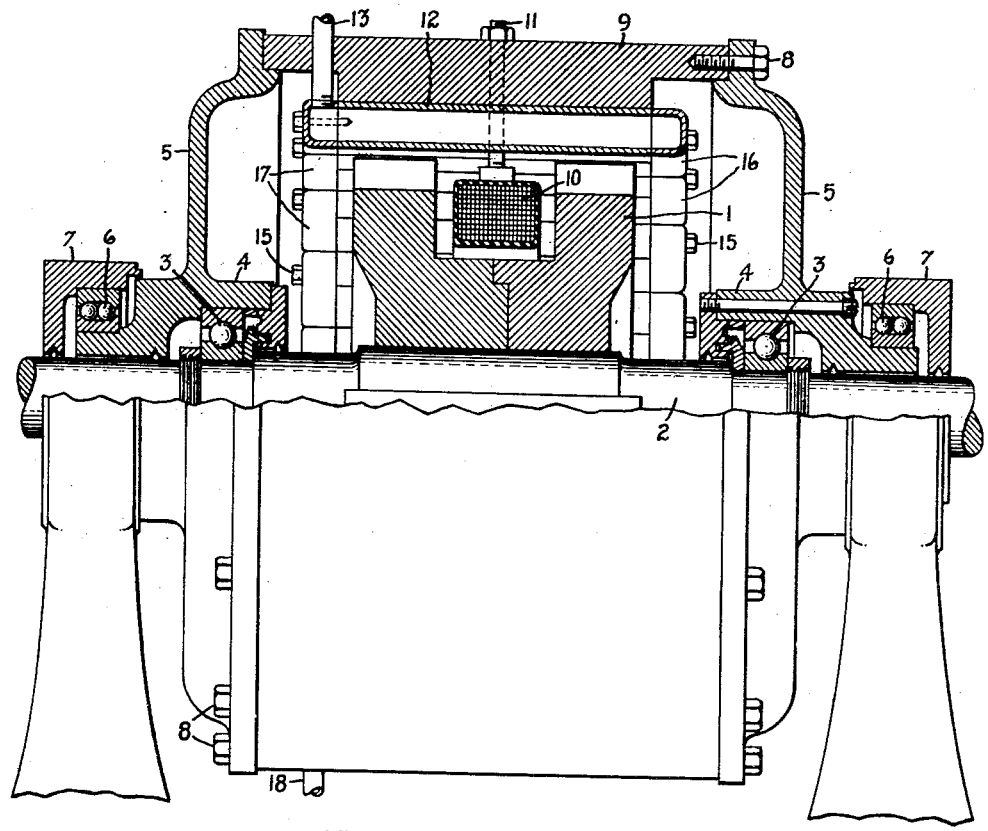
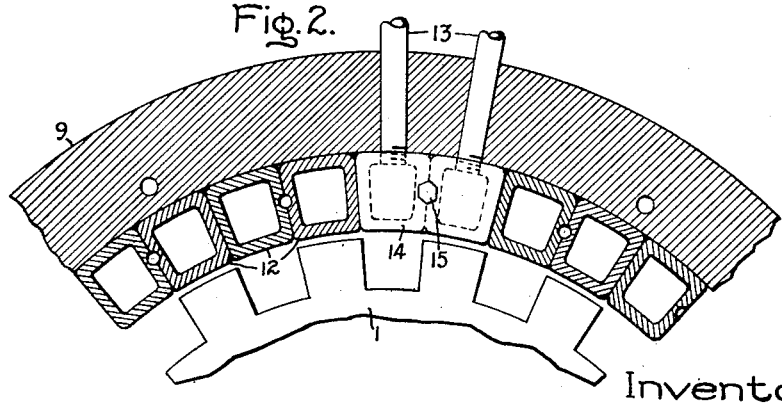
Inventor:
Harold M. Martin,
by Harry E. Dunham
His Attorney.

Oct. 9, 1945.  H. M. MARTIN  2,386,701
DYNAMOELECTRIC MACHINE
Filed May 27, 1944  2 Sheets-Sheet 2
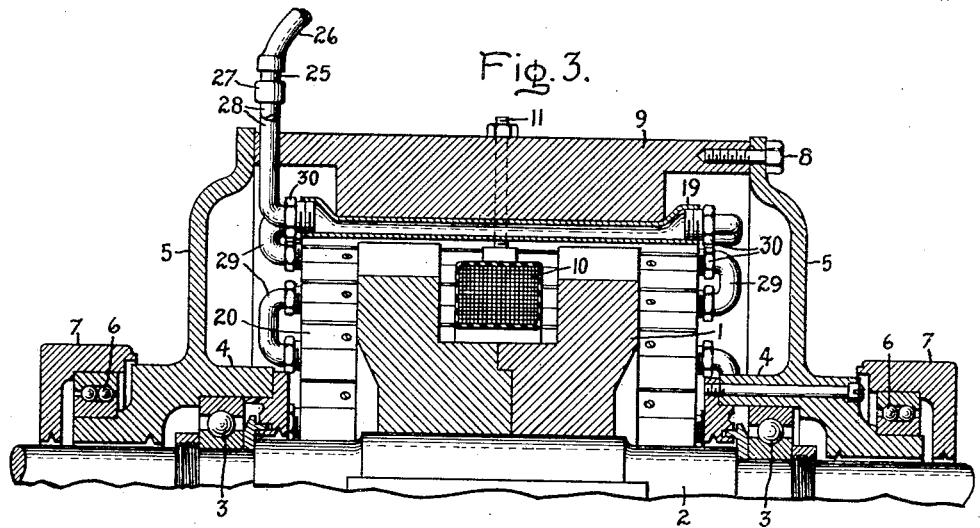
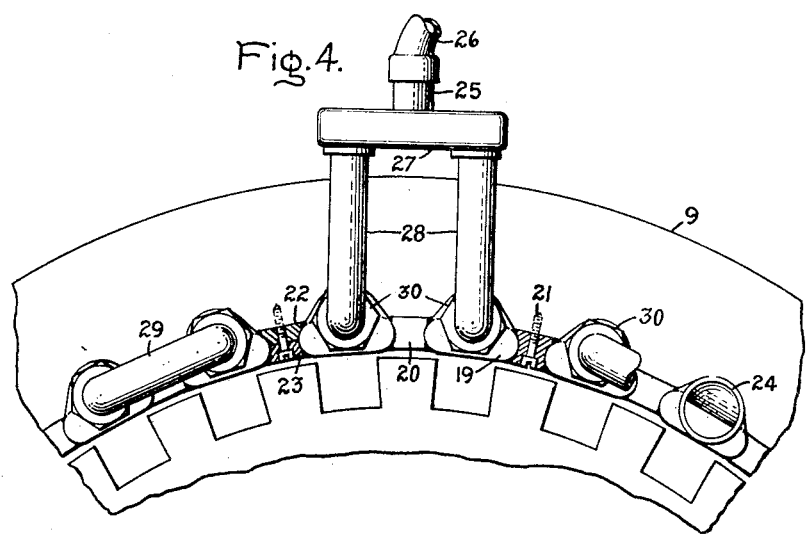
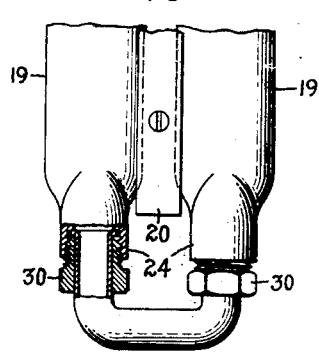
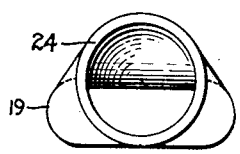
Inventor:
Harold M. Martin,
by Harry E. Dunham
His Attorney.

Patented Oct. 9, 1945

2,386,701

UNITED STATES PATENT OFFICE 2,386,701

DYNAMOELECTRIC MACHINE

Harold M. Martin, Schenectady, N. Y., assignor to General Electric Company, a corporation of New York Application May 27, 1944, Serial No. 537,591

11 Claims. (Cl. 188—104)

My invention relates to dynamoelectric machines and particularly to an inductor type machine having an improved cooling arrangement.

An object of my invention is to provide a dynamoelectric machine having an improved cooling arrangement.

Another object of my invention is to provide an improved inductor type dynamometer.

Further objects and advantages of my invention will become apparent and my invention will be better understood from the following description referring to the accompanying drawings, and the features of novelty which characterize my invention will be pointed out with particularity in the claims annexed to and forming part of this specification.

In the drawings, Fig. 1 is a side elevational view of an inductor type eddy current dynamometer, partly broken away to show an embodiment of my improved cooling arrangement; Fig. 2 is an enlarged sectional view through a part of the stationary member frame and inductor portion of the machine shown in Fig. 1; Fig. 3 is a fragmentary side elevational view, partly in section, illustrating another embodiment of my invention; Fig. 4 is an enlarged end view of a part of the dynamometer shown in Fig. 3; Fig. 5 is a partial view of a pair of tubular elements and their interconnection, partly in section, used in the construction shown in Figs. 3 and 4; and Fig. 6 is an enlarged end view of one of the tubular members shown in Figs. 3, 4, and 5.

Referring to the drawings, I have shown a dynamoelectric machine of the inductor type in the form of an eddy current dynamometer provided with a multipolar toothed rotatable member 1 formed of two parts mounted on a shaft 2 which is rotatably supported adjacent each end thereof by antifriction ball bearings 3 mounted in bearing housings 4. These bearing housings are formed as a part of end frames 5 of the stationary member of the machine, and these frames 5 are rotatably supported by antifriction ball bearings 6 mounted in bearing pedestals 7 to provide for a rotatable support of the relatively stationary member of the machine. The end frames 5 are secured by screws 8 to a substantially cylindrical stationary member frame 9 of magnetic material which is adapted to be excited by a toroidal field exciting winding 10 arranged between the two parts of the rotatable member 1 and rigidly mounted on the stationary member frame 9 by a plurality of circumferentially spaced apart mounting studs 11 so that the entire stationary member including the field exciting winding 10 is adapted to be cradled on the supporting bearings 6.

In this type machine, the slotted rotatable member 1 is adapted to induce eddy currents in the stationary member to absorb energy which is supplied to the rotatable member through the shaft 2. The absorption of this energy in the form of eddy currents generates a relatively large amount of heat which must be dissipated from the machine in order to prevent the machine from becoming destructively heated. In this embodiment of my invention, this heat is generated in the form of eddy currents in the inner surfaces of a plurality of flattened substantially trapezoidal section tubular members 12 formed of magnetic material, such that these members are adapted to carry the magnetic flux from the teeth of the member 1 into the stationary member frame 9 and back again to the teeth of the member 1. Cooling fluid, such as water, is adapted to be supplied to the interior of the tubular members 12 through suitable supply tubes 13 which connect to a double header 14 secured by a screw 15 to an end of a pair of tubular members adjacent the top of the stationary member 9. The opposite ends of the two tubes to which the cooling fluid is supplied are connected by reverse-bend headers 16 to the next adjacent tube on each side of the machine, so as to recirculate the cooling fluid axially through the next adjacent tube, and similar reverse-bend interconnecting headers 17 interconnect the ends of adjacent pairs of tubular members on each side of the cooling fluid supply tubes 13, and headers 16 on the opposite ends of the tubular members 12 from the supply tubes 13 interconnect the opposite ends of the tubular members 12 into pairs, such that each of a pair of tubular members connected together by the headers 16 at one end is connected to another tubular member by a header 17 at the opposite end, thereby providing two interconnections of a series of tubular members forming two axially extending, reversing flow, circuitous cooling fluid paths about the inner periphery of the stationary member tubular inductor portion. The two tubular members 12 at the bottom of the machine are connected to drain pipes 18 for exhausting the cooling fluid from the tubular members. Thus, the cooling fluid is adapted to be passed directly through the members in which the eddy currents are generated, thereby providing for a very efficient transfer of heat to the cooling medium. In order to provide for required expansion of the liner formed by these tubular members within the inner periphery of the frame as the temperature of the machine is raised, the tubular members 12 are not secured rigidly to the stationary member frame 9, but are held in place with slight clearances by the keystone arch support effect which is produced by the trapezoidal section shape of these tubular members. This provides for the necessary expansion of these members and the axially free arrangement of these tubular members provides for a free axial expansion thereof, thereby obviating the possibility of the development of cracks and breaks in these elements which often result when an eddy current member is formed as a solid inductor element. In addition, these tubular members lend themselves very readily to being repaired, as any faulty tube can be readily removed and replaced by another similar tube member.

In Figs. 3 to 6, inclusive, I have shown another embodiment of my invention which is provided with a rotatable member 1 mounted on a shaft 2 and supported by bearings 3 in a bearing housing 4 formed on end shields 5 which are rotatably supported by bearings 6 in pedestals 7 in the same manner as in the construction shown in Fig. 1. In this arrangement, the end frames 5 of the machine also are secured by screws 8 to a stationary member frame 9 which supports a field exciting winding 10 between the two halves of the rotatable member 1 through clamp studs 11. In this construction, however, the eddy current inductor portion of the stationary member is formed by a plurality of flattened tubular members 19 of magnetic material which are circumferentially spaced apart and fastened to the frame 9 by a plurality of supporting block members 20 formed of magnetic material and having concave sides which loosely fit about the sides of the tubular members 19. These supporting blocks 20 are rigidly fastened to the stationary member frame 9 by screws 21, and all but one of the blocks are formed as one piece elements which are adapted to be assembled alternately with one of the tubular members 19 about the inner periphery of the frame 9 to form a liner within this frame, and the last supporting block is formed in two pieces 22 and 23 to facilitate the assembly and disassembly of this arrangement. These tubular members 19 are formed from cylindrical tubes and only the intermediate portions of the tubes are flattened as shown in these figures, while the end portions 24 are left cylindrical and are internally threaded to provide for the interconnection of the tubular members. As in the construction shown in Fig. 1, a cooling fluid, such as water, is adapted to be supplied to the interior of the tubular members to provide for the removal of the heat generated by the eddy currents therein, and this cooling fluid is supplied through a tubular member 25 connected to a source of supply through a flexible connection 26 and distributed through a header 27 to two supply tubes 28 which are connected at one side of the machine to the ends of the upper two tubular members 19 through a suitable pipe connection similar to that shown in Fig. 5. As in the arrangement shown in Figs. 1 and 2, a reversing flow circuitous cooling fluid path is formed through the tubular members by connecting the ends of each of the tubular members opposite the ends connected to the supply tubes 28 to the adjacent tubular member 19 to provide for the return of the cooling fluid through the next tubular member. This interconnection is formed by a return-bend header 29 which is secured to the tubular members by pipe couplings 30 screwed into the threaded end portion 24 of each tubular member 19 as shown in detail in Fig. 5. In this manner, heat which is generated by the eddy currents in the tubular members 19 can be readily transferred to the cooling fluid which passes through these members, and as the temperature of these members is raised, the clearances between the loosely held tubular members 19 and the supporting blocks 20 permit expansion of the members without producing destructive stresses therein. Furthermore, the heat generated by eddy currents in the supporting blocks 20 also is transferred by conduction to the tubular members 19 and from these members to the cooling fluid. As in the arrangement shown in Fig. 1 the lower pair of tubular members is connected to a drain pipe 18 to provide for exhausting the cooling fluid from the pair of circuitous cooling fluid paths. The detail interconnections of the ends of the tubular members 19 into pairs is the same as that shown in Figs. 1 and 2 in order to assure a maximum utilization of the cooling fluid. If desired, the number of circuitous cooling fluid paths about the inner periphery of the stationary member can be increased by increasing the number of supply tubes and the number of drain connections which can be connected at different places about the periphery of the machine. This construction possesses the same advantages as the arrangement shown in Fig. 1 which facilitates repairs and provides for the desired expansion and contraction of the eddy current inductor liner in the stationary member frame.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. An inductor type dynamoelectric machine having a rotatable inductor member of magnetic material, a field exciting winding, a stationary member having a frame and an eddy current inductor portion formed of a plurality of axially extending tubular members of magnetic material providing a liner in said frame, means for supplying cooling fluid into said tubular members, and means for exhausting cooling fluid from said tubular members.

2. An inductor type dynamoelectric machine having a rotatable inductor member of magnetic material, a field exciting winding, a stationary member having a frame and an eddy current inductor portion formed of a plurality of axially extending flattened tubular members of magnetic material secured in said frame, means for supplying cooling fluid into said tubular members, and means for exhausting cooling fluid from said tubular members.

3. An inductor type dynamometer having a rotatable inductor member of magnetic material, a field exciting winding, a stationary member having a frame and an eddy current inductor portion formed of a plurality of axially extending tubular members of magnetic material, means for supplying cooling fluid into said tubular members, means for interconnecting said tubular members for providing a circuitous cooling fluid path through said stationary member tubular inductor portion, and means for exhausting cooling fluid from said tubular members.

4. An inductor type dynamometer having a rotatable inductor member of magnetic material, a field exciting winding, a stationary member having a frame and an eddy current inductor portion formed of a plurality of axially extending tubular members of magnetic material arranged as a liner within the inner periphery of said frame, means for supplying cooling fluid into said tubular members, means for interconnecting the ends of adjacent pairs of said tubular members arranged to provide an interconnection of a series of tubular members forming a circuitous cooling fluid path about the inner periphery of said stationary member through said tubular inductor portion, and means for exhausting cooling fluid from said tubular members.

5. An inductor type dynamoelectric machine having a rotatable inductor member of magnetic material, a field exciting winding, a stationary member having a frame and an eddy current inductor portion formed of a plurality of axially extending flattened tubular members of magnetic material secured in said frame, means for supplying cooling fluid into said tubular members, means for interconnecting the ends of some of said tubular members on each end of said stationary member for providing an interconnection of a series of tubular members forming a circuitous cooling fluid path about the inner periphery of said stationary member tubular inductor portion, and means for exhausting cooling fluid from said tubular members.

6. An inductor type dynamometer having a rotatable inductor member of magnetic material, a field exciting winding, a stationary member having a frame and an eddy current inductor portion formed of a plurality of axially extending tubular members of magnetic material arranged as a liner within the inner periphery of said frame, means for supplying cooling fluid into said tubular members, means for interconnecting the ends of adjacent pairs of said tubular members on one side of said stationary member and for interconnecting into pairs the opposite ends of adjacent tubular members each of which is connected at the first end to another tubular member for providing an interconnection of a series of tubular members forming a circuitous cooling fluid path about the inner periphery of said stationary member tubular inductor portion, and means for exhausting cooling fluid from said tubular members.

7. An inductor type dynamometer having a rotatable toothed inductor member of magnetic material, a field exciting winding, a stationary member having a frame and an eddy current inductor portion formed of a plurality of axially extending tubular members of magnetic material, means fastened to said frame and arranged to support said tubular members in said frame, means for supplying cooling fluid into said tubular members, means for interconnecting the ends of some of said tubular members on each side of said stationary member for providing an interconnection of a series of tubular members forming a circuitous cooling fluid path about the inner periphery of said stationary member tubular inductor portion, and means for exhausting said cooling fluid from said tubular members.

8. An inductor type dynamometer having a rotatable toothed inductor member of magnetic material, a field exciting winding, a stationary member having a frame and an eddy current inductor portion formed of a plurality of axially extending flattened tubular members of magnetic material, means including supporting blocks of magnetic material fastened to said frame and arranged to support said tubular members in said frame, means for supplying cooling fluid into said tubular members, means for interconnecting the ends of some of said tubular members on each side of said stationary member for providing an interconnection of a series of tubular members forming a circuitous cooling fluid path about the inner periphery of said stationary member tubular inductor portion, and means for exhausting said cooling fluid from said tubular members.

9. An inductor type dynamometer having a rotatable inductor member of magnetic material, a field exciting winding, a stationary member having a frame and an eddy current inductor portion formed of a plurality of axially extending trapezoidal section tubular members of magnetic material, means for supplying cooling fluid into said tubular members, means for interconnecting said tubular members for providing an interconnection of a series of tubular members forming a circuitous cooling fluid path about the inner periphery of said stationary member tubular inductor portion, and means for exhausting cooling fluid from said tubular members.

10. An inductor type dynamometer having a rotatable inductor member of magnetic material, a field exciting winding, a stationary member having a frame and an eddy current inductor portion formed of a plurality of axially extending trapezoidal section tubular members of magnetic material arranged as a liner within the inner periphery of said frame, means for supplying cooling fluid into said tubular members, means for interconnecting said tubular members arranged to provide an interconnection of a series of tubular members forming a circuitous cooling fluid path about the inner periphery of said stationary member through said tubular inductor portion, and means for exhausting cooling fluid from said tubular members.

11. An inductor type dynamometer having a rotatable toothed inductor member of magnetic material, a field exciting winding, a stationary member having a frame and an eddy current inductor portion formed of a plurality of axially extending flattened tubular members of magnetic material, means including supporting blocks of magnetic material fastened to said frame and arranged to support said tubular members in said frame, means for supplying cooling fluid into said tubular members, means for interconnecting the ends of adjacent pairs of said tubular members on each side of said supply means on one side of said stationary member and for interconnecting into pairs the opposite ends of adjacent tubular members each of which is connected at the first end to another tubular member for providing two interconnections of a series of tubular members forming two circuitous cooling fluid paths about the inner periphery of said stationary member tubular inductor portion, and means for exhausting said cooling fluid from said tubular members.

HAROLD M. MARTIN.